UNITED STATES PATENT OFFICE.

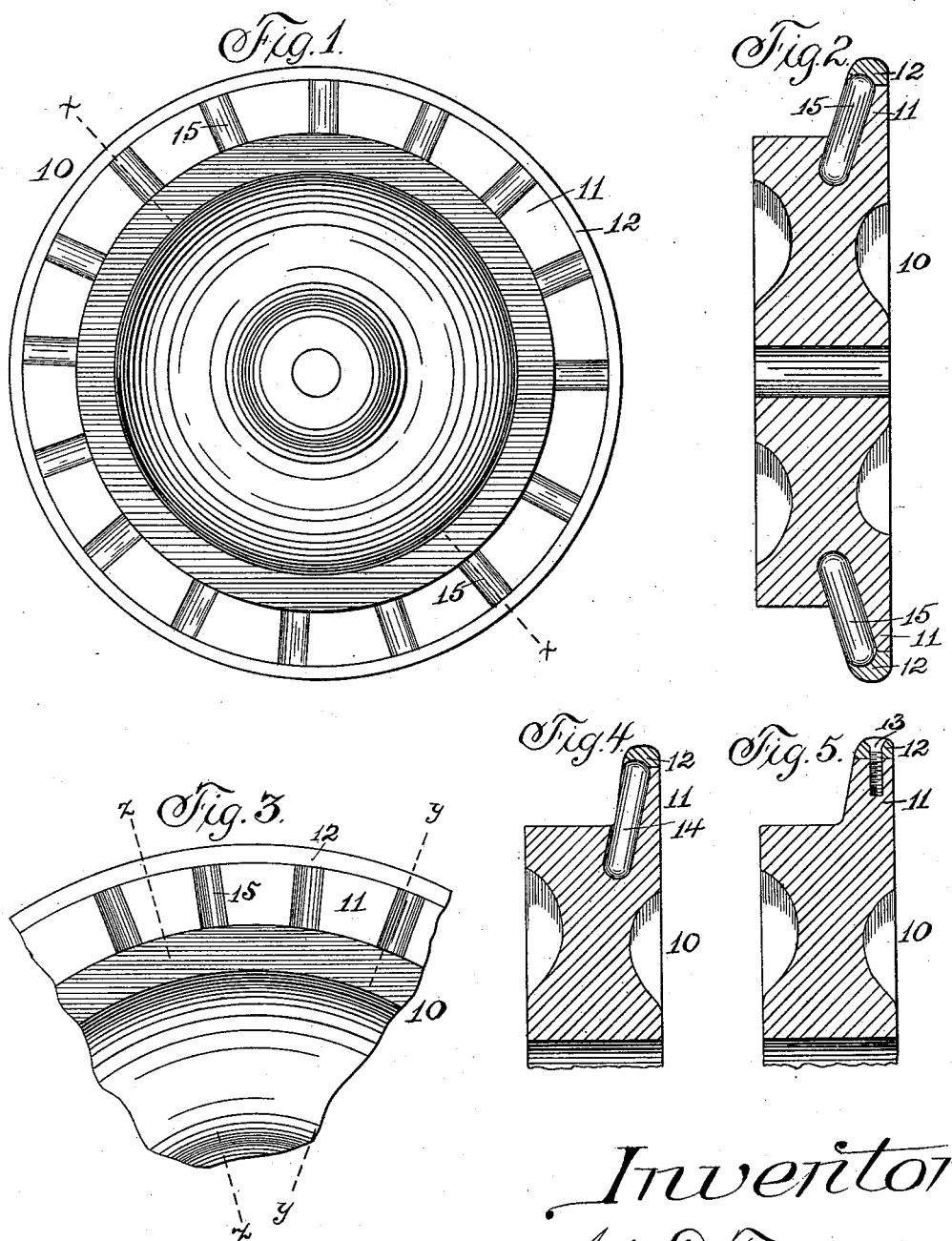

JOHN D. FARQUHER, OF DES MOINES, IOWA, ASSIGNOR OF ONE-THIRD TO HENRY E. LONG, OF SAME PLACE.

ANTI-FRICTION CAR-WHEEL.

SPECIFICATION forming part of Letters Patent No. 472,944, dated April 12, 1892.

Application filed November 17, 1891. Serial No. 412,115. (No model.)

*To all whom it may concern:*

Be it known that I, JOHN D. FARQUHER, a citizen of the United States, and a resident of Des Moines, in the county of Polk and State of Iowa, have invented certain new and useful Improvements in Anti-Friction Devices for Railway-Car Wheels, of which the following is a specification.

The object of this my invention is to be found in the provision of means for overcoming the friction between the flanges of railway-car wheels and the outer rail of a curve in a track in the advancement of a railway car or coach about a curve, which friction is occasioned by the inertia of the car.

My invention consists in the combination, with a railway-car wheel having the ordinary hub, web, tread, and flange integrally formed in the usual manner, of a plurality of anti-friction devices rotatably and radially journaled within the flange of the wheel or the tread and flange and so relatively positioned as to be acted upon to rotate in a path transversely to the plane of rotation of the wheel when brought in contact with the rail of the track in the advancement of a car about a curve.

My invention consists, further, in the combination, with a railway-car wheel having an integral tread and flange and a removable and replaceable tire, of a series of radially-disposed recesses formed in the flange thereof or in the flange and tread, a plurality of anti-friction rollers mounted within said recesses, said rollers being so positioned as to contact against the rail of the track in the advancement of the car about a curve.

My invention consists, further, in the details of construction and combination of parts hereinafter set forth, pointed out in my claims, and illustrated by the accompanying drawings, in which—

Figure 1 is a view of the outer side of a railway-car wheel embodying my invention. Fig. 2 is a diametrical sectional view on the line X X of Fig. 1. Fig. 3 is an enlarged detail view of a segmental portion of the complete wheel. Fig. 4 is an enlarged detail sectional view on the line Y Y of Fig. 3, the roller being removed. Fig. 5 is an enlarged detailed sectional view on the line Z Z of Fig. 3, showing the means of securing the tire to the wheel.

In the construction of the device as shown the numeral 10 designates a railway-car wheel, and 11 the flange formed integrally. A removable and replaceable tire 12 is secured to the periphery of the flange 11 by means of screws 13, countersunk within the tire 12 and flange 11, Fig. 5. Radial recesses 14 are formed in the tread of the wheel 10 and extend outward transversely of the flange 11 to a point within the tire 12 on the side of said flange adjacent to the rail on which the wheel is supported. Both ends of the recesses 14 extending within the tire and the tread of the wheel 10 are concaved. Anti-friction rollers 15, corresponding in length with the radial recesses and of approximately like diameter, are inserted and confined within said recesses by means of the tire 12. Both ends of the anti-friction rollers 15 extending within the tire 12 and tread of the wheel 10 are convex and fit snugly within the concaved ends of the recesses 14 within said tire.

In the construction of the hereinbefore-described wheel I preferably bore out the recesses 14 in the flange and tread of the wheel for the desired diameter and depth. I then form the concaved ends of the recesses in the tire and tread before placing said tire upon the wheel.

The anti-friction rollers 15 are preferably made of chilled steel and turned to the desired diameter, which diameter should approximate as nearly as possible to the diameter of the radial recess in which each respective roller is to be inserted. The rollers are then placed within the radial recesses and the tire placed on the wheel and shrunk to fit snugly thereon. The screw-seats are then formed by drilling through the tire 12 into the flange 11, and said tire further secured to the wheel by means of the countersunk screws 13.

Heretofore it has been found practically impossible to so construct railway curves or car-wheels as to overcome the tendency of the car-wheels to crowd the outer rail of the track and produce a frictional contact therewith when traveling about a curve, which friction and crowding is occasioned by the inertia of the advancing car wearing abnormally on the ball of the rail and the flanges and treads of the car-wheels, causing the trucks of the car to "get out of square," and, in a case where the trucks support and carry power-transmitting gearing, displacing the alignment of said gearing. My invention overcomes this crowding of the outer rail and consequent friction by the disposition of the rollers in the flange of the wheel, so that when the wheel-flanges approach the ball of said rail in the advancement of the car about a curve said rollers will engage against the ball of said rail and become rotated by frictional contact therewith in a plane transversely to the plane of rotation of the wheel, thus materially lessening the friction. By this means the wheels are caused to travel smoothly around the curve, the intermittent motion heretofore common being entirely overcome.

By the use of my improved device the ordinary, constant, and usual flattening and brooming of the inner edge of the curved rail is overcome, thus lengthening the life of the rail. It will be further apparent that the draft, pull, or resistance of the car or train is materially lessened by thus overcoming the friction between the flange and the rail.

Having thus described my invention, what I claim as new therein, and desire to secure by Letters Patent of the United States therefor, is—

1. In a railway-car wheel, the combination, with the tread of said wheel and the flange thereof integrally formed, of anti-friction bearings carried by and disposed radially upon the flange of the car-wheel and projecting slightly beyond the face of said flange, whereby said bearings when contacting with the rail of a track are rotated in a plane approximately at right angles to the plane of rotation of the wheel.

2. In a railway-car wheel, the combination, with the flange of said wheel, which flange is formed integrally with the tread, of rollers journaled in said flange, the plane of rotation of said rollers being at right angles to the plane of rotation of said wheel.

3. In a railway-car wheel, the combination, with a wheel and the flange thereof integrally formed, which flange is provided with radial recesses, of a removable and replaceable tire mounted about the periphery of said flange and means for securing said tire to said flange, together with anti-friction rollers mounted within said radial recesses.

4. The combination, in a railway-car wheel, of a wheel and the flange integrally formed thereon, radial recesses formed in the flange of said wheel or in the flange and tread and extending within the tread thereof angularly relatively to the plane of rotation of said wheel, anti-friction rollers inserted within said radial recesses, and means for securing said rollers and retaining them in the desired position.

5. In a railway-car wheel, the combination, with the wheel and the flange integrally formed thereon, of radial recesses formed in said flange or in the flange and tread and extending within the tread of the wheel, anti-friction rollers rotatably mounted within said radial recesses, and a removable and replaceable tire provided with bearings for said anti-friction rollers mounted about the periphery of said flange, whereby said rollers are held in the desired position.

6. In a railway-car wheel having an integral tread and flange provided with recesses formed in said tread and flange, in combination with anti-friction rollers rotatably mounted within the recesses and adapted to contact with the curved rail of the track in the advancement of the car-wheel along the same, whereby the rollers are rotated at right angles relatively to the plane of rotation of the wheel.

7. In a device for overcoming friction between a curved track-rail and a railway-car wheel, the combination, with the tread thereof, of a plurality of radial recesses in the said tread and flange and a plurality of anti-friction rollers corresponding in number to the recesses and rotatably mounted therein, whereby the rollers are rotated at right angles relatively to the plane of rotation of the wheel.

JOHN D. FARQUHER.

Witnesses:
C. C. BULKLEY,
S. C. SWEET.